United States Patent
Pierce et al.

[15] 3,650,063
[45] Mar. 21, 1972

[54] OUTRIGGER FISHING DEVICE WITH QUICK-DETACHABLE HOOK COUPLING

[72] Inventors: Irving L. Pierce, 11363 Garfield; Harold E. Schenavar, 18696 Inkster Road, both of Detroit, Mich. 48240

[22] Filed: Sept. 21, 1970

[21] Appl. No.: 73,808

[52] U.S. Cl. ............................ 43/42.74, 43/43.15, 43/44.84
[51] Int. Cl. ....................................................... A01k 91/04
[58] Field of Search .......................... 43/42.74, 43.15, 44.84

[56] References Cited

UNITED STATES PATENTS

| 289,612 | 12/1883 | Bollermann | 43/44.84 |
| 790,336 | 5/1905 | Yoerger | 43/42.74 |
| 1,720,287 | 7/1929 | Moore | 43/42.74 X |
| 2,033,701 | 3/1936 | Gibbs | 43/44.84 |
| 2,145,992 | 2/1939 | Parker | 43/44.74 |
| 2,170,788 | 8/1939 | Augenblick | 43/44.74 |
| 2,315,295 | 3/1943 | Stogermayr | 43/44.74 |
| 2,763,955 | 9/1956 | Mead | 43/42.74 |
| 3,426,468 | 2/1969 | Hinkson | 43/43.15 |
| 3,421,250 | 1/1969 | Kreig | 43/42.74 |

FOREIGN PATENTS OR APPLICATIONS

| 10,418 | 1899 | Great Britain | 43/44.84 |

*Primary Examiner*—Joseph S. Reich
*Attorney*—Barthel & Bugbee

[57] ABSTRACT

Pivotally mounted between fixed stops on a drop wire or leader weighted at its lower end with a sinker is the coiled-wire hub of an approximately Z-shaped spring wire outrigger. The laterally-bent eye of a horizontal fish hook is quick-detachably interlocked with the laterally-offset V-shaped loop on the outer end of this outrigger with the reversely-bent portion of the loop passing through the eye of the fish hook and detachably secured by a coiled-wire sleeve slidably mounted on the outrigger and yieldably held in place of the laterally-bent detent end thereof. In a modification, arms of the outrigger automatically counterbalance one another for easier swinging, and their hooks disposed in horizontal planes tend to be deflected as they are raised or lowered past obstructions, thereby reducing snagging.

10 Claims, 3 Drawing Figures

PATENTED MAR 21 1972  3,650,063
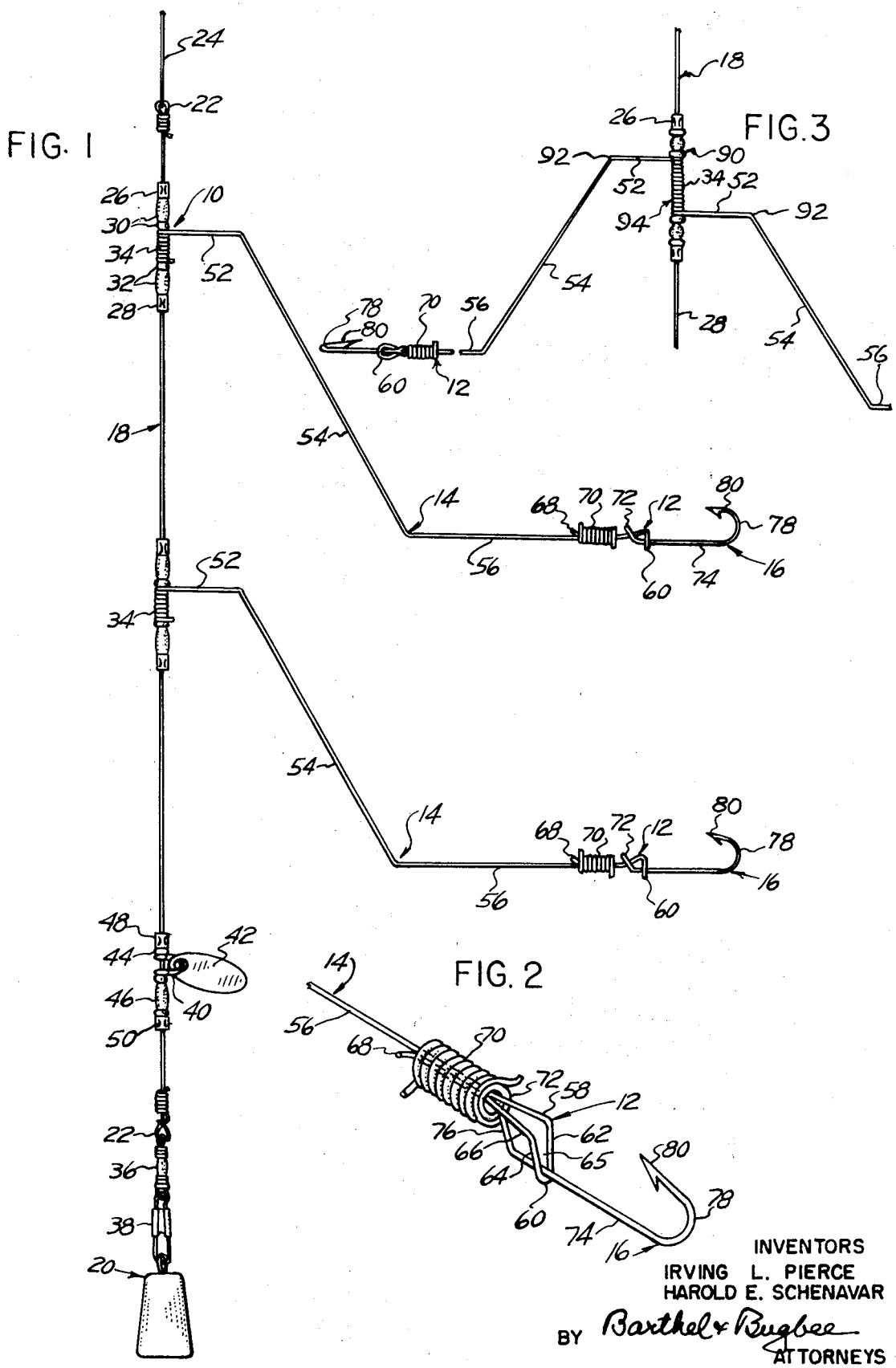

OUTRIGGER FISHING DEVICE WITH QUICK-DETACHABLE HOOK COUPLING

The object of this invention is to provide a fishing device including a drop wire adapted to be held in a vertical position by being attached to a fishing line at one end and sinker at the other, the wire having plural generally horizontal outriggers extending laterally therefrom and having quick detachable fish hooks extending colinearly and horizontally from the free ends of the outriggers so as to present the barbed ends of the hooks toward a fish encountering the same. The outriggers are made from resilient material, have a Z-shape and are pivotally attached to rotate around the vertical drop wire.

In the drawings,

FIG. 1 is a side elevation of the outrigger fishing device, according to one form of the invention, FIG. 2 is an enlarged perspective view of the quick-detachable fish hook connection at the outer end of the outrigger; and FIG. 3 is a fragmentary side elevation of a double-armed outrigger fishing device according to a modification of the invention.

Referring to the drawing in detail, FIG. 1 shows an outrigger fishing device, generally designated 10, with a quick-detachable hook coupling, generally designated 12, on the outer end of an outrigger 14 of stainless steel spring wire for detachably securing thereto a horizontal fish hook 16. Each outrigger 14, of which two are shown for convenience, is pivotally mounted upon a vertical drop wire or leader 18 weighted at the lower end thereof with a sinker 20. The upper and lower ends of the drop wire 18 are formed into eyes 22 to the upper one of which the lower end portion of a fishing line 24 is tied. Secured as by crimping in spaced relationship on the drop wire 18 are pairs of fixed stops 26 and 28 respectively above and below pairs of bearing beads 30 and 32 rotatably threaded on the drop wire 18 and pivotally supporting the coiled wire hub portion 34 at the inner end of each outrigger 14.

Mounted on the lower eye 22 of the drop wire 18 is a swivel 36 on the lower end of which is mounted a detachable coupling 38 having the well-known construction similar to a conventional safety pin and detachably holding the eye of the sinker 20. Optionally mounted intermediate the upper and lower ends of the drop wire 18 is a clevis 40 carrying an attraction-getting flasher or spoon 42, the clevis being mounted between upper and lower bearing beads 44 and 46 which in turn are held between fixed upper and lower stops 48 and 50 crimped or otherwise fixedly secured to the drop wire 18.

Each outrigger 14 consists of an upper horizontal portion 52 which is a continuation of the coiled wire hub 34, a downwardly and outwardly inclined intermediate portion 54 integral with the upper horizontal portion 52, and a lower horizontal portion 56 extending outward from and integral with the inclined intermediate portion 54. The outer end part 58 of the lower horizontal portion 56 of each outrigger 14 terminates in a reversely-bent open V-shaped laterally-offset loop 60 (FIG. 2) consisting of opposite arms 62 and 64 inclined downward toward one another so as to fit different diameters of hook shanks in the V-shaped notch 65 therebetween. The arm 64 terminates in a reversely-bent end part 66 which in turn terminates in a short laterally-bent detent end 68. Slidably mounted on and along the end parts 58 and 66 is a coiled wire sleeve 70 of stainless steel spring wire, the forward end of which engages the eye 72 of the fish hook 16. In the latter, the eye 72 is connected to the shank 74 by a laterally-offset portion 76. The hook 64 terminates in the usual reversely-curved portion 78 and barb 80. If desired, serrations are formed on the hook shank 74 to inhibit unwanted sliding of the loop 60 and shank 74 relatively to one another.

In the use of the outrigger fishing device 10 of the invention, let it be assumed that the fishing line 24 has been attached to the upper loop 22 of the drop wire 18 and that one or more outriggers 14 have been previously mounted thereon, also that a horizontal hook 16 is likewise attached to the outer end loop 60 of each outrigger 14, as explained in more detail below. suitably each fish hook 16 suitable baited, the fisherman, if fishing from a dock, bank of a water course or boat drops the thus prepared device 10 into the water, where each outrigger 14 swings upon its hub 34 around the drop wire 18 in response to any current in the water. A float or "bob" is preferably attached to the line 24 to keep the drop wire 18 taut when the sinker 20 is resting on the bottom of the water course. A fish attacking the bait (not shown) on a hook 16 becomes impaled on the barb 80 thereof with the minimum of interference from the remainder of the hook 16 because of its horizontal position. The fish is then landed in the usual manner.

To change to a different hook 16, the fisherman grasps the eye 72 thereof in one hand while he pulls the sleeve 70 away from the eye 72 over the detent end 68 of the arm 66, the sharp end 68 entering and then clicking past the grooves between the convolutions of the sleeve 70 on the inside thereof as the latter is slid over it. Alternatively, the sleeve 70 can be rotated to advance it like a nut relatively to the end 68. With the sleeve 70 beyond the detect 68, the fisherman pushes the fish hook 16 to the left until its eye 72 deflects and passes beyond the detent end 68, whereupon the fisherman then pulls the fish hook 16 to the right (FIG. 2), causing the eye 72 thereof to slide along the outer end part 58, down the arm 62, up the arm 64, along the end part 66 and off the detent end 68. To attach a new or different hook 16, he reverses the procedure thus described, first passing the hook eye 72 over the detent end 68 and along the end part 66, arms 64 and 62, and end part 58. First making sure that the shank 74 lies in the notch 65 between the arms 62 and 64, he then slides the coiled wire sleeve 70 to the right over the detent end 68, locking the laterally-offset eye 72 of the hook 16 against the laterally-offset loop 60.

While the foregoing operations of attaching and detaching the hook 16 have been described by the use of the fisherman's hand, it will be evident that this operation can be facilitated and accidents prevented by the use of the pliers which are included in the usual equipment of a fisherman's tackle box.

The Z-shaped outrigger 14 has less tendency to droop than a straight outrigger, and it gives a constant movement to the bait as it jiggles in and out as well as up and down. It also revolves or moves away when a fish strikes at it, increasing the motion of the bait. The use of two outriggers 14 is preferably because fish often travel in pairs, with the result that the device 10 so equipped often catches two fish at the same time. The use of a live bait, such as a minnow, accentuates the jiggling effect of the outrigger 14. The outriggers 14 are conveniently placed 4 to 6 inches apart on the drop wire 18. In fishing through the ice a shorter outrigger 14 may preferably be used because of the small diameter of the holes chopped through the ice.

The double-armed outrigger fishing device, generally designated 90, shown in FIG. 3 is a modification of the fishing device 10 shown in FIGS. 1 and 2, in that, as its name indicates, it has two Z-shaped arms 92 forming with the coiled-wire hub 34 a double-armed outrigger 94 instead of the single-armed outriggers 14 in the fishing device 10 of FIG. 1. In particular, the portions 52, 54 and 56 of each Z-shaped arm 92 are connected to and integral with the upper and lower ends of the coiled wire hub 34 so that they counterbalance one another. This results in easier swinging of the double arms 92 of the outrigger 94 to and fro horizontally by counteracting the side thrusts of the coiled wire hub portion 34 between them upon the drop wire 18. Furthermore, the reversely-bent portions 78 of the hooks 16 in FIG. 3 are disposed in horizontal planes approximately perpendicular to the drop wire 18 rather than in the vertical planes of FIGS. 1 and 2. This construction has the advantage of tending to be deflected as they encounter obstructions in the water as the arms are raised or lowered past these obstructions. In other respects, the double-armed outrigger fishing device 90 is similar to the single-arm device 10 of FIG. 1 and similar parts are therefore designated with the same reference numerals.

I claim:

1. A fishing device comprising a drop member disposed in a vertical position and having at its upper end means for attachment to a fishing line, an approximately Z-shaped outrigger of resilient material mounted on said drop member and extending downward and outward therefrom and having substantially horizontal upper and lower portions and a downwardly and outwardly inclined portion interconnecting said upper and lower therefrom, a fish hook mounted on the outer end of said outrigger, and a sinker mounted on said drop member below said outrigger.

2. A fishing device, according to claim 1, wherein said drop member has a bearing stop mounted thereon, and wherein said outrigger has a hub portion pivotally engaging said bearing stop for swinging motion relatively to said drop member.

3. A fishing device, according to claim 2, wherein said outrigger consists of a spring wire having a coiled portion at the inner end thereof constituting said hub portion.

4. A fishing device, according to claim 1, wherein said outer end of said outrigger has a quick-detachable hook coupling thereon, and wherein said fish hook has a laterally-offset eye connected to said coupling.

5. A fishing device, according to claim 4, wherein said coupling consists of oppositely disposed end portions of said outrigger with a loop offset therefrom and therebetween forming a hook shank notch, and wherein said fish hook has a shank seated in said notch with said eye disposed adjacent said loop.

6. A fishing device, according to claim 5, wherein said coupling also has a locking sleeve slidably mounted on said outrigger for motion into and out of locking engagement with said outrigger end portions.

7. A fishing device, according to claim 6, wherein said locking sleeve comprises a tightly-coiled wire with a helical groove between the convolutions thereof, and wherein one of said outrigger end portions has a laterally directed detent end detainingly engaging said helical groove.

8. A fishing device, according to claim 1, wherein said hook has a shank disposed in a substantially horizontal position relatively to said outrigger.

9. A fishing device, according to claim 2, wherein an additional approximately Z-shaped outrigger of resilient material is connected to said hub portion and extends outward therefrom in the opposite direction relatively to said first-mentioned Z-shaped outrigger.

10. A fishing device, according to claim 1, wherein each fish hook has a pointed reversely-bent end portion disposed in a plane approximately perpendicular to said drop member.

* * * * *